Aug. 28, 1956     A. SPRUNG     2,760,481
COMBINATION FLAME SPREADER AND RECEPTACLE HOLDER
Filed June 22, 1955
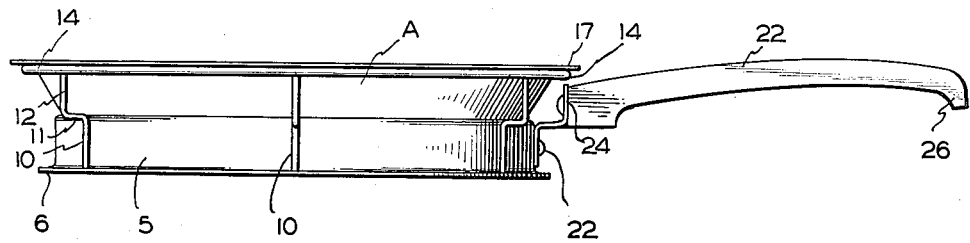
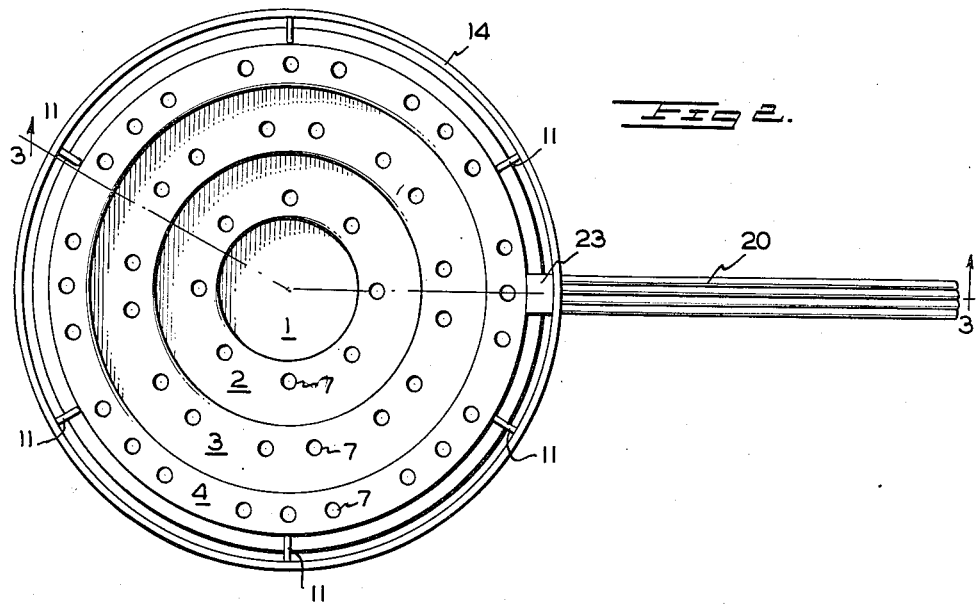
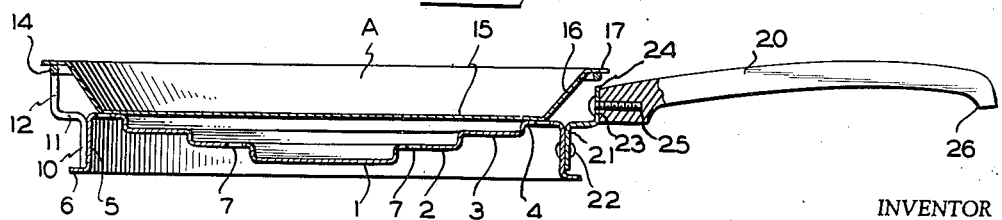
INVENTOR
ABRAHAM SPRUNG
BY
ATTORNEY United States Patent Office 2,760,481
Patented Aug. 28, 1956

2,760,481

COMBINATION FLAME SPREADER AND RECEPTACLE HOLDER

Abraham Sprung, Brooklyn, N. Y.

Application June 22, 1955, Serial No. 517,193

1 Claim. (Cl. 126—215)

This invention relates to improvements in a combined flame spreader and a holder for disposable pans, skillets and the like formed of metal foil, although capable of use in supporting any conventional cooking utensil such as a casserole, pot, or analogous device.

One of the objects of this invention is to provide a heat or flame spreader adapted to fit over and about a conventional gas or electric stove burner for retaining and distributing the heat from the burner to the surface of a cooking vessel which is supported thereby.

Another object of the invention is to provide a heat retainer and spreader for use in connection with the conventional stove burner and embodying a wire supporting frame capable of supporting the conventional foil receptacles of the general form of a pie pan or the like and in which certain frozen foods are sold.

Another object of the invention is to provide a combined device which retains and confines the heat or flame from a stove burner and distributes the same to a confined area of a cooking utensil which may be supported thereby, the flame spreader embodying a rigid wire framework to confine the utensil and lend support thereto during the cooking operation.

Other features of the invention will more clearly hereinafter appear by reference to the accompanying drawings forming a part of the instant specification and wherein like characters of reference designate corresponding parts throughout the several views, in which:

Fig. 1 is a side elevation;
Fig. 2 is a top plan view; and
Fig. 3 is a transverse section.

Generally the invention embodies a flame spreader having a surface shown as formed of suitable sheet metal and including a plurality of outwardly and downwardly annular stepped sections 1, 2, 3 and 4, the outer annular stepped section 4 having its marginal edge bent downwardly at 5 and flared outwardly at its peripheral marginal edge at 6 to form a heat-confining housing encompassing the stepped central supporting section. It will be noted that the downturned cylindrical portion 5 extends substantially below the central supporting section 1 so that when the flange 6 of the structure rests upon a heated surface or over a burner, the heat will be confined within the area defined by the cylindrical portion 5. The stepped sections 2, 3 and 4 are each shown as provided with a plurality of perforations 7 which may be symmetrically arranged or disposed to provide maximum efficiency transmitting the heat to the receptacle generally indicated by reference character A and which receptacle is shown resting on the outer stepped section 4 of the device.

For holding and supporting a pan or a disposable foil food container, a metal frame is provided including a plurality of metal supports shown of wire construction having upright inner portions 10 welded to the outer faces of the cylindrical outer portion 5 of the flame or heat spreader structure. There are a multiplicity of these wire supporting arms suitably spaced and secured about the body 5, these wire supporting arms having their medial portion offset outwardly as at 11 and terminating in generally upright terminal portions 12 which have their upper ends secured to the circular wire supporting frame 14. It will be obvious that spacing the supporting frame from the spreader structure and supporting same at points laterally of the spreader flange 5 accommodates any conventional cooking pan, such as a pie pan, or the like, and their foil counterparts. Normally, these pie pans and the like, include the flat base 15, the laterally extending angular sidewall portion 16 and the flanged marginal edge 17, which as shown, rests upon the annular wire supporting ring 14.

A suitable insulated handle 20 is illustrated, this handle being connected to a bracket having a bottom section 21 riveted at 22 to the angular flange 5 of the flame spreading structure, offset medial portion 23, and upright upper extremity 24. The handle is shown as having a flat inner end portion which abuts against the upright portion 24 of the handle bracket and is secured thereto by the screw 25, as best shown in Fig. 3. This handle which is formed of non-heat-conducting metal extends outwardly generally in the plane of the assembly and is provided with downturned extremity 26 to provide a good gripping structure which will not permit the device to escape from the hands of a person who might be using same.

It will be obvious that the device may be made in any shape and that the heat retaining area under the stepped plate portion within the flame spreader may be enlarged by modifying the height of the structure or the diameter of the structure and it will also be obvious that the transfer of heat from the burner to the pan supported by the flame spreader may be modified as advisable by suitable arrangement of perforations in lieu of the disclosure of the application.

It will also be obvious that the device can be used in supporting pans and pots of less diameter than the diameter of the wire support 14. In fact the stepped portion of the flame spreader provides vertical confining walls for a multiplicity of pots and pans and containers of different sizes regardless of the main wire supporting structure extending above the flame spreader. Generally the device has particular use in connection with the so-called disposable aluminum foil replacement pans which are commercially available for frying, serving and eating and are generally utilized in connection with frozen foods and food combinations. The device is also capable of use in connection with double boilers, Dutch ovens and similar structures used for baking and reheating on the top of the stove. Further uses of the device would be in the heating and serving of foods in cans which would readily fit within the stepped flame spreader and likewise in connection with the poaching of eggs and toasting of bread, the device being suitable and available for use in the toasting of bread without use of any additional attachments which might be necessary, as for instance in the poaching of eggs.

What I claim is:

In a device of the character described, a flame spreader structure including a stepped plate-like body having a downwardly extending cylindrical marginal supporting portion, a plurality of offset arms fixed to the outer face of the cylindrical portion of the flame spreader and extending above the plate-like body, and a confining and supporting ring fixed to the upper end portion of the offset arms, said ring being spaced from and above said flame spreader for supporting and confining receptacles over the flame spreader.

(References on following page)

References Cited in the file of this patent

UNITED STATES PATENTS

| | | |
|---|---|---|
| 1,109,323 | Cruickshank | Sept. 1, 1914 |
| 1,698,926 | Wentorf et al. | Jan. 15, 1929 |
| 1,716,329 | Simpson | June 4, 1929 |
| 2,174,425 | Schlumbohm | Sept. 26, 1939 |
| 2,593,003 | Block | Apr. 15, 1952 |

FOREIGN PATENTS

| | | |
|---|---|---|
| 11,281 | Sweden | Aug. 4, 1900 |
| 341,591 | Germany | Oct. 5, 1921 |
| 580,457 | France | Sept. 1, 1924 |